(12) United States Patent
Holtzman et al.

(10) Patent No.: US 9,386,578 B2
(45) Date of Patent: Jul. 5, 2016

(54) METHODS AND SYSTEMS FOR NODE OPERATION ACCORDING TO NETWORK-WIDE RESOURCE-ALLOCATION SCHEDULES

(71) Applicant: MOTOROLA SOLUTIONS, INC, Schaumburg, IL (US)

(72) Inventors: Guy Holtzman, Tel Aviv (IL); Baruh Hason, Tel Aviv-Yaffo (IL); Pavel Livshits, Modiyin (IL); Gabi Ofir, Reshon Letzion (IL)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 116 days.

(21) Appl. No.: 14/308,379

(22) Filed: Jun. 18, 2014

(65) Prior Publication Data
US 2015/0373700 A1    Dec. 24, 2015

(51) Int. Cl.
*H04W 72/04*    (2009.01)
*H04L 12/911*    (2013.01)
*H04W 84/18*    (2009.01)

(52) U.S. Cl.
CPC ........... *H04W 72/0446* (2013.01); *H04L 47/72* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 8,040,857 B2 * | 10/2011 | Wang | H04L 1/20 370/322 |
| 8,385,322 B2 | 2/2013 | Colling et al. | |
| 2004/0028018 A1 * | 2/2004 | Cain | H04B 7/2643 370/338 |
| 2005/0058149 A1 * | 3/2005 | Howe | H04L 47/10 370/428 |
| 2007/0115895 A1 * | 5/2007 | Ling | G01S 5/0289 370/338 |
| 2007/0280153 A1 * | 12/2007 | Sinha | H04W 16/12 370/328 |
| 2008/0008138 A1 | 1/2008 | Pun | |
| 2008/0247407 A1 * | 10/2008 | Westphal | H04W 72/1257 370/406 |
| 2009/0003306 A1 * | 1/2009 | Plutov | H04W 72/10 370/348 |

(Continued)

OTHER PUBLICATIONS

Prabh, K. Shashi et al., "On Scheduling and Real-Time Capacity of Hexagonal Wireless Sensor Networks," 19th Euromicro Conference on Real-Time Systems (ECRTS '07), 2007, pp. 1-10.*

*Primary Examiner* — Donald Mills

(57) ABSTRACT

Disclosed herein are methods and systems for node operation according to network-wide resource-allocation schedules. One embodiment takes the form of a method carried out by a given node within an ad-hoc wireless network, which includes a controller node for a current time period. The method includes obtaining one or more air-interface resource requests for the current time period, where each obtained resource request indicates a requesting node and a requested resource. The method further includes using a network-standard algorithm for deriving a network-wide resource-allocation schedule for the current time period based at least in part on the obtained resource requests. The method further includes verifying the derived resource-allocation schedule based at least in part on a verification value derived by the controller node from the network-wide resource-allocation schedule using a network-standard verification function. The method also includes operating according to the verified resource-allocation schedule for the current time period.

18 Claims, 7 Drawing Sheets

(56) References Cited

U.S. PATENT DOCUMENTS

| | | | | |
|---|---|---|---|---|
| 2009/0034446 A1* | 2/2009 | Adams | | H04W 28/06 370/314 |
| 2009/0201860 A1* | 8/2009 | Sherman | | H04L 12/1881 370/329 |
| 2010/0124207 A1* | 5/2010 | Ghanadan | | H04W 74/02 370/336 |
| 2010/0260153 A1* | 10/2010 | Hollick | | H04L 12/5695 370/336 |
| 2011/0051674 A1 | 3/2011 | Niedzwiecki et al. | | |
| 2011/0164527 A1* | 7/2011 | Mishra | | H04L 45/123 370/252 |
| 2012/0044827 A1* | 2/2012 | In | | H04W 56/0075 370/252 |
| 2012/0250632 A1 | 10/2012 | Mo et al. | | |
| 2013/0188524 A1 | 7/2013 | Cheng et al. | | |

* cited by examiner

METHODS AND SYSTEMS FOR NODE OPERATION ACCORDING TO NETWORK-WIDE RESOURCE-ALLOCATION SCHEDULES

BACKGROUND OF THE INVENTION

Wireless-communication devices (hereinafter "nodes") such as cell phones, smart phones, and mobile Wi-Fi hotspots are generally configured with the ability to communicate with other network entities via a wireless network. Well known examples of wireless-communication protocols according to which such wireless networks operate include relatively long-range wireless-communication protocols (e.g., Global System for Mobile Communications (GSM), Long Term Evolution (LTE), and the like), relatively short-range wireless-communication protocols (e.g., Wi-Fi and the like), and/or one or more land mobile radio (LMR) protocols (e.g., European Telecommunications Standards Institute Digital Mobile Radio (ETSI-DMR), Terrestrial Trunked Radio (TETRA), APCO Project 25 (P25), Digital Mobile Radio (DMR), and the like), among numerous other examples.

Nodes in an infrastructure-based wireless network typically communicate over an air interface with a network-dedicated base station such as a base transceiver station (BTS), an eNodeB, a wireless access point, and/or a Wi-Fi router (among other examples). The base station is generally responsible for relaying communication between nodes and/or between other networks (such as the Internet). Respective nodes in an infrastructure-based wireless network typically do not communicate directly with other nodes over an air interface.

An ad-hoc wireless network, in contrast, typically does not include a dedicated base station for relaying communication. Rather, each node in the network functions to relay communication between nodes in the network. A respective node will typically communicate directly with nodes that are within wireless-communication range of the respective node, and will otherwise rely on intermediate nodes to relay communication with network nodes that are not within range of the respective node. Moreover, some nodes can function (often according to various device modes) in both infrastructure-based wireless networks and ad-hoc wireless networks, as is known to those having skill in the relevant art.

Wireless networks, both infrastructure-based and ad-hoc, are susceptible to "collisions": if more than one node in a wireless network is transmitting at any given time, the interference resulting from the simultaneous transmissions may lead to the loss of the communications in the respective transmissions. In an infrastructure-based wireless network, the base station can coordinate permitted transmission times for the respective network nodes so as to avoid collisions. Because ad-hoc wireless networks operate without such a dedicated entity, a different approach is needed to avoid collisions in such networks. Accordingly, there is a need for methods and systems for node operation according to network-wide resource-allocation schedules.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
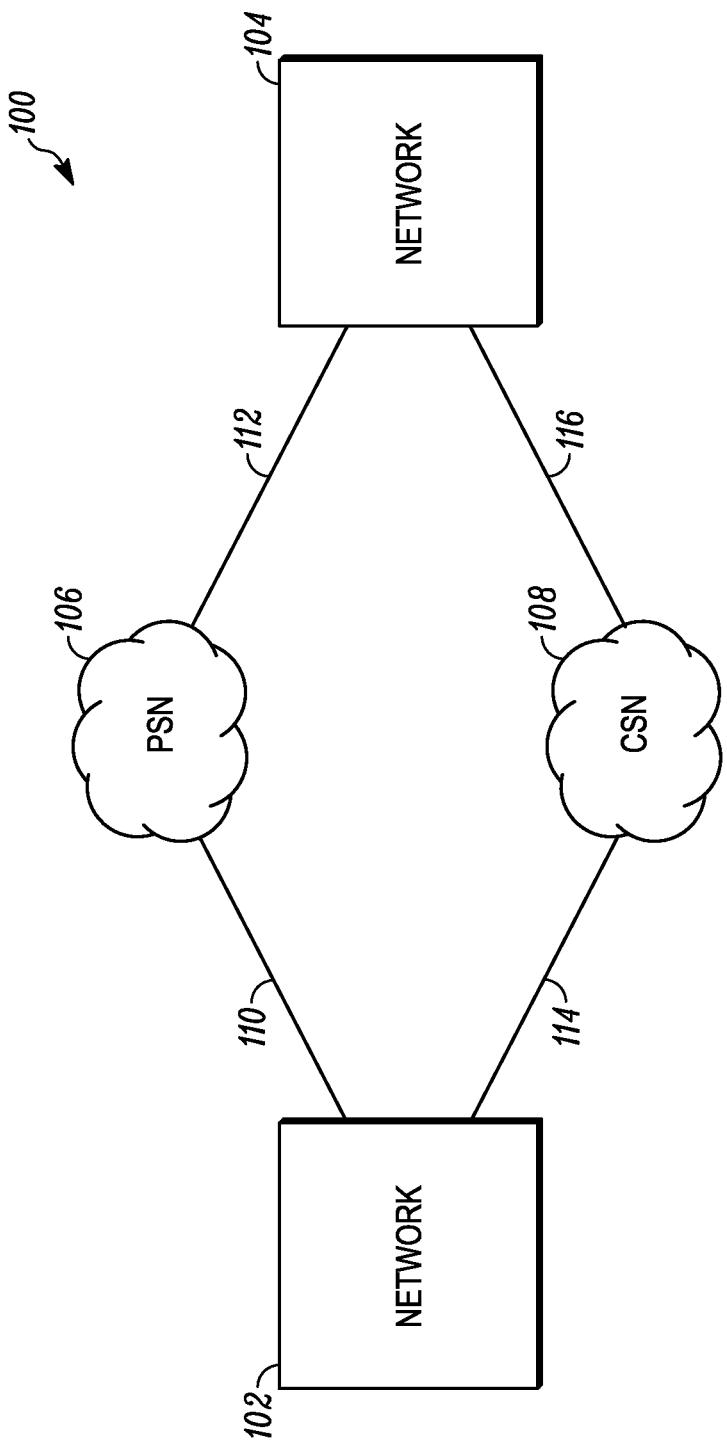
FIG. 1 depicts an example communication system in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for node operation according to network-wide resource-allocation schedules. One embodiment takes the form of a method carried out by a given node within an ad-hoc wireless network, which includes a controller node for a current time period. The method includes obtaining one or more air-interface resource requests for the current time period, where each obtained resource request indicates a requesting node and a requested resource. The method further includes using a network-standard algorithm for deriving a network-wide resource-allocation schedule for the current time period based at least in part on the obtained resource requests. The method further includes verifying the derived resource-allocation schedule based at least in part on a verification value derived by the controller node from the network-wide resource-allocation schedule using a network-standard verification function. The method also includes operating according to the verified resource-allocation schedule for the current time period.

Another embodiment takes the form of a node having a communication interface comprising a wireless-communication interface, a processor, and data storage containing instructions executable by the processor for causing the given node to carry out at least the functions listed in the preceding paragraph. Moreover, any of the variations and permutations described in the ensuing paragraphs and anywhere else herein can be implemented with respect to any embodiments, including with respect to any method embodiments and any system embodiments.

In at least one embodiment, each requested resource includes one or more requested time slots in the current time period, and the network-wide resource-allocation schedule includes an allocation schedule with respect to one or more time slots in the current time period.

In at least one embodiment, obtaining the one or more resource requests includes receiving a particular resource request from a second node in the network.

In at least one embodiment in which obtaining the one or more resource requests includes receiving a particular resource request from a second node in the network, the second node is the requesting node indicated by the particular resource request.

In at least one embodiment in which obtaining the one or more resource requests includes receiving a particular resource request from a second node in the network, a third node is the requesting node indicated by the particular resource request. And in at least one such embodiment, obtaining the one or more resource requests further includes receiving the particular resource request from the third node.

In at least one embodiment in which obtaining the one or more resource requests includes receiving a particular resource request from a second node in the network, obtaining the one or more resource requests further includes generating and broadcasting one or more resource requests.

In at least one embodiment, obtaining the one or more resource requests includes generating and broadcasting one or more resource requests.

In at least one embodiment in which obtaining the one or more resource requests includes generating and broadcasting one or more resource requests, the one or more generated resource requests include one or more continuation resource requests, and broadcasting the one or more generated resource requests includes broadcasting one or more of the generated continuation resource requests during one or more time slots allocated exclusively to the given node for broadcasting continuation resource requests.

In at least one embodiment in which obtaining the one or more resource requests includes generating and broadcasting one or more resource requests, the one or more generated resource requests include one or more new resource requests, and broadcasting the one or more generated resource requests includes broadcasting one or more of the generated new resource requests during one or more time slots designated for multiple access. In at least one such embodiment, the following function is also carried out: rebroadcasting a particular new resource request in response to determining that a new-resource-request rebroadcast received from the controller node does not include the particular new resource request.

In at least one embodiment, one or more of the obtained resource requests include respective priority values, and deriving the network-wide resource-allocation schedule for the current time period based at least in part on the obtained resource requests includes deriving the network-wide resource-allocation schedule for the current time period based at least in part on one or more of the priority values.

In at least one embodiment, the network-standard verification function includes a hash function.

In at least one embodiment, the given node is the controller node.

In at least one embodiment in which the given node is the controller node, the following function is also carried out: broadcasting an identification of one or more time slots designated for multiple access.

In at least one embodiment in which the given node is the controller node, obtaining the one or more resource requests includes receiving one or more new resource requests during one or more time slots designated for multiple access, and the following function is also carried out: rebroadcasting the one or more received new resource requests.

In at least one embodiment in which the given node is the controller node, verifying the derived resource-allocation schedule based at least in part on the verification value comprises broadcasting the derived verification value.

In at least one embodiment, the given node is not the controller node.

In at least one embodiment in which the given node is not the controller node, verifying the derived resource-allocation schedule based at least in part on the verification value involves: receiving the verification value from the controller node; deriving a local verification value from the network-wide resource-allocation schedule using the network-standard verification function; and comparing the received verification value with the local verification value.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . . " And it is for reasons akin to brevity and clarity of presentation that this implied leading clause is not repeated ad nauseum in this detailed description.

FIG. 1 depicts an example communication system in accordance with an embodiment. As shown, communication system 100 includes respective wireless networks 102 and 104, a packet-switched network (PSN) 106, and a circuit-switched network (CSN) 108. Wireless networks 102 and 104 are connected to PSN 106 by respective communication links 110 and 112, and to CSN 108 by respective communication links 114 and 116. Those having skill in the art will appreciate that additional and/or different entities may be present in communication system 100.

Wireless networks 102 and 104 may be any wireless networks equipped and configured by those of skill in the relevant art to function as described herein. One or both of wireless networks 102 and 104 may operate according to one or more standards such as CDMA2000, LTE, Bluetooth, ZigBee, and/or any of the network standards discussed above, among other possibilities.

PSN 106 could be the worldwide network typically referred to as the Internet, but could just as well be any other packet-switched network equipped and configured by those of skill in the relevant art to function as described herein. Entities resident on PSN 106 may be Internet Protocol (IP) entities and may be addressed using IP addresses. CSN 108 could be the circuit-switched communication network typically referred to as the Public Switched Telephone Network (PSTN), but could just as well be any other circuit-switched network arranged and configured by those of skill in the relevant art to function as described herein.

Any one or more of communication links 110-116 could include one or more communication devices, networks, connections, switches, bridges, routers, and the like. Any or all of communication links 110-116 could make use of wired and/or wireless forms of communication. One or more communication links instead of and/or in addition to communication links 110-116 could be present. As one example, there could be one or more communication links between PSN 106 and CSN 108.

Figure 2:
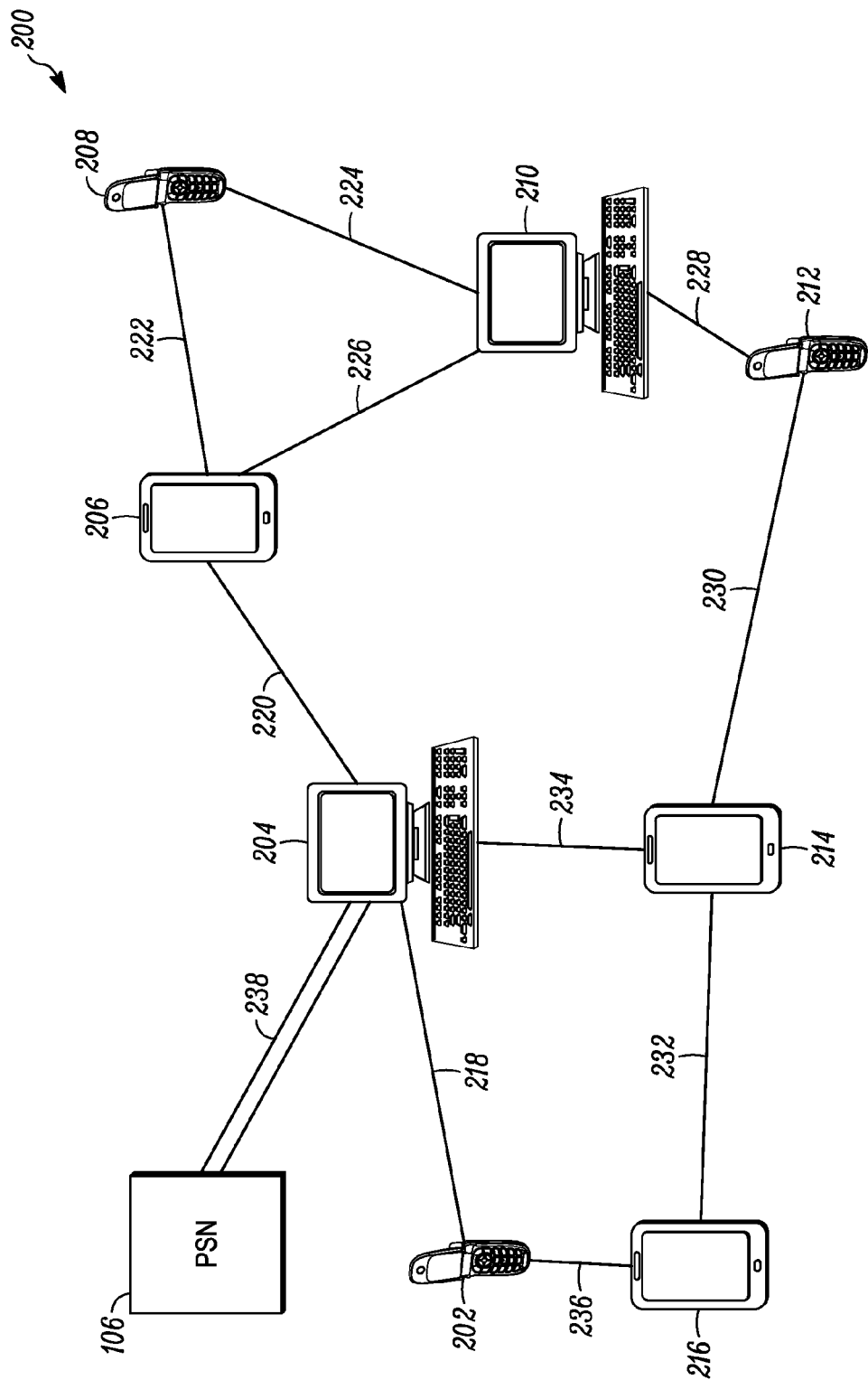
FIG. 2 depicts an example ad-hoc wireless network in accordance with an embodiment.

FIG. 2 depicts an example ad-hoc wireless network in accordance with an embodiment. As illustrated, ad-hoc wireless network 200 includes nodes 202-216, each of which are communicatively connected via communication links 218-236. Network 200 could take the form of a mobile ad-hoc network (MANET), a wireless mesh network, and/or a wireless sensor network, among other examples. It should be understood that ad-hoc wireless network 200 may take other forms and may include different and/or additional entities.

An example node is described more fully below in connection with FIG. 3, though in general any one or more of nodes 202-216 of FIG. 2 may take the form of respective mobile phones, smart phones, tablet computers, notebook computers, portable media players, loudspeakers, televisions, and/or any other device capable of ad-hoc wireless communication, among numerous other possibilities.

Communication links 218-236 may take the form of respective radio-frequency (RF) air-interface links between respective nodes that are each within the other's wireless-communication range. The air-interface links may comply with one or more standards (e.g., TETRA, Wi-Fi, etc.) discussed above, among numerous other possibilities. One or more nodes in network 200 may function to relay communication between other nodes that are not within each other's wireless-communication range, but that are within the wireless-communication range of one or more relaying nodes.

A given node may function as a gateway to one or more other networks. For example, as illustrated in FIG. 2, node 204 is communicatively connected to PSN 106 via communication link 238. Node 204 may thus be capable of communicating with one or more entities in network 104 (or other networks) via PSN 106, and other nodes in network 102 may be capable of communicating with those entities via node 204 (which functions to relay communication between PSN 106 and other nodes in network 102). Node 204 (or another node) could be communicatively connected to CSN 108 (possibly in additional to PSN 106), among other possibilities.

In an embodiment, one of the nodes in network 200 is designated as a controller node for a given period of time. During the given time period (for example, at the end of the time period), another node (or possibly the then-designated controller node) is designated as a controller node for a next time period (if, for example, a controller node is still needed after the end of the current time period).

Figure 3:
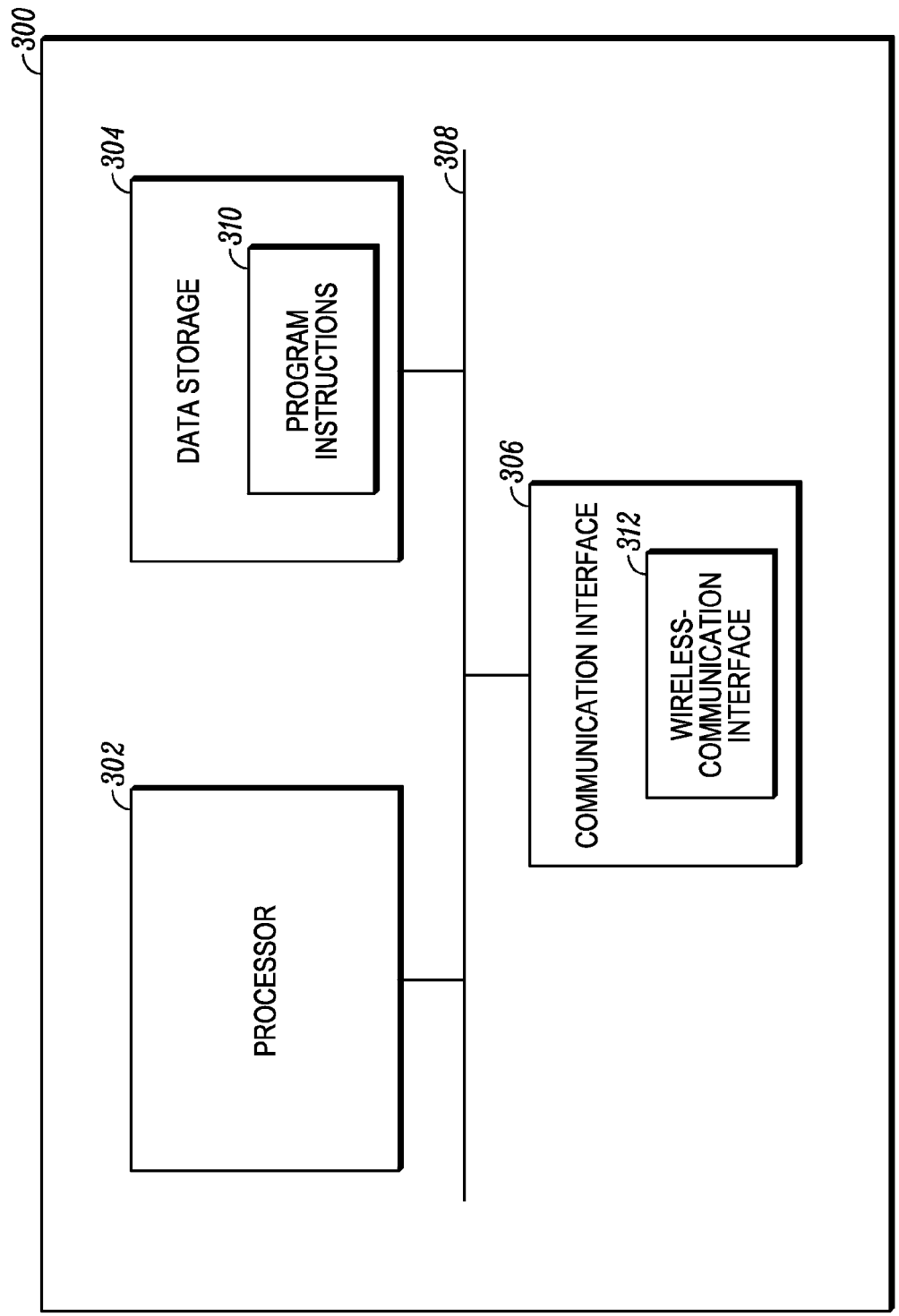
FIG. 3 depicts an example node in accordance with an embodiment.

FIG. 3 depicts an example node in accordance with an embodiment. As illustrated, node 300 includes a processor 302, data storage 304, and a communication interface 306, all of which are communicatively connected by a system bus 308. Different and/or additional components may be present: for example, node 300 could further include a user interface. It should be understood that node 300 may take other forms as well. Moreover, any of the nodes 202-216 may take a form similar to that of the example node 300 that is described in connection with FIG. 3.

Processor 302 may include one or more processors of any type deemed suitable by those of skill in the relevant art, some examples including a general-purpose microprocessor, a dedicated digital signal processor (DSP), and a graphics processor. Data storage 304 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. In the embodiment that is depicted in FIG. 3, data storage 304 contains program instructions 310 executable by processor 302 for carrying out various combinations of the node functions described herein. The data storage could include additional data as well, including (as examples) user-interface data, resource-allocation-schedule data, network routing data, and/or any other types of data deemed suitable by those of skill in the relevant art for carrying out the functions described herein.

Communication interface 306 is depicted as including a wireless-communication interface 312, which in turn could include components such as one or more antennae, one or more transmitters and/or receivers designed and configured for one or more types of wireless communication, and/or any other components deemed suitable by those of skill in the relevant art. In addition to wireless-communication interface 312, communication interface 306 could include additional communication-interface technology such as one or more wired (e.g., Ethernet) communication interfaces for facilitating communication with various network entities.

Figure 4:
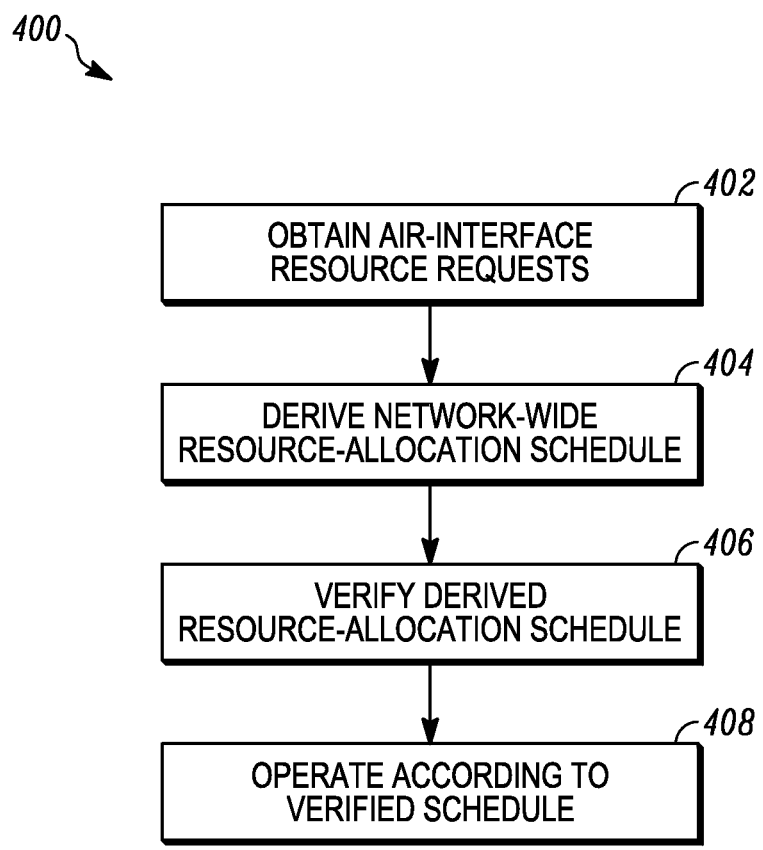
FIG. 4 is a flowchart of an example process in accordance with an embodiment.

FIG. 4 is a flowchart of an example process carried out by a given node within an ad-hoc wireless network of nodes. And although the example process 400 is described below as being carried out by the example node 300, which could represent any of the nodes 202-216 depicted in FIG. 2 in connection with the example ad-hoc wireless network 200, those having skill in the art will appreciate that other entities within other ad-hoc wireless networks could carry out the process. Prior to further discussing the example process 400, the paragraphs below that pertain to FIGS. 5-7 offer a description of an example arrangement of an air-interface link the time domain, in an example network such as the example network 200 of FIG. 2.

Figure 5:
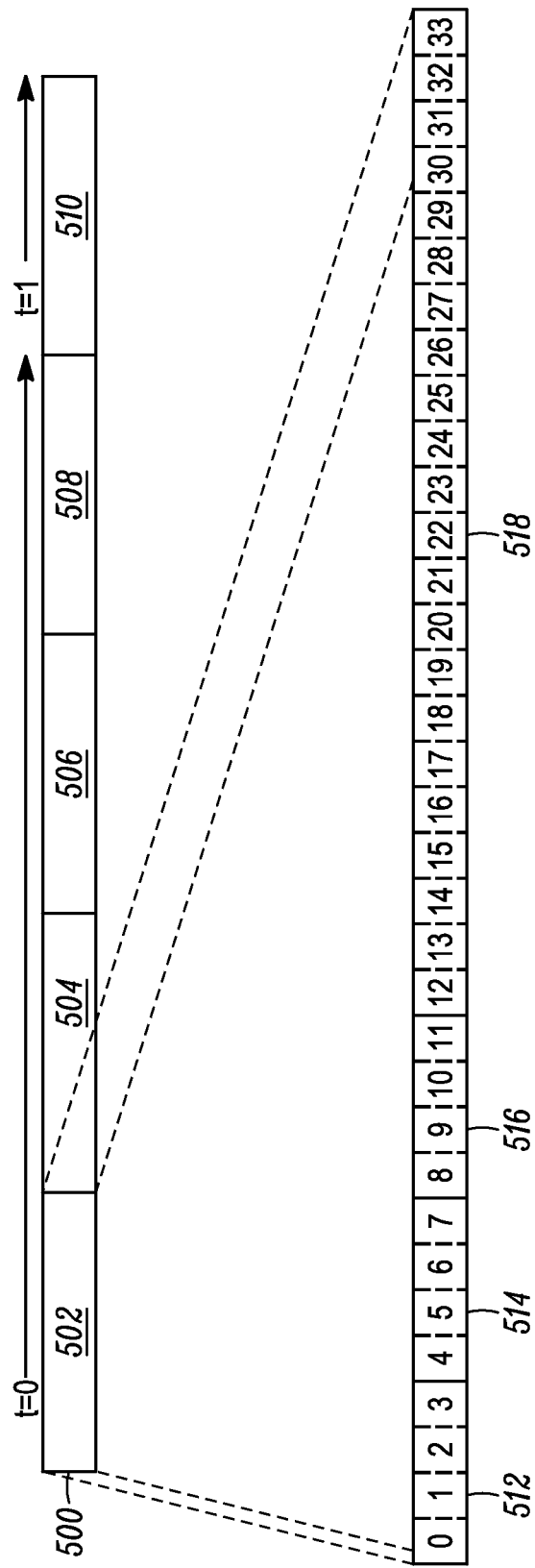
FIGS. 5-7 depict example air-interface links in accordance with an embodiment.
Figure 6:
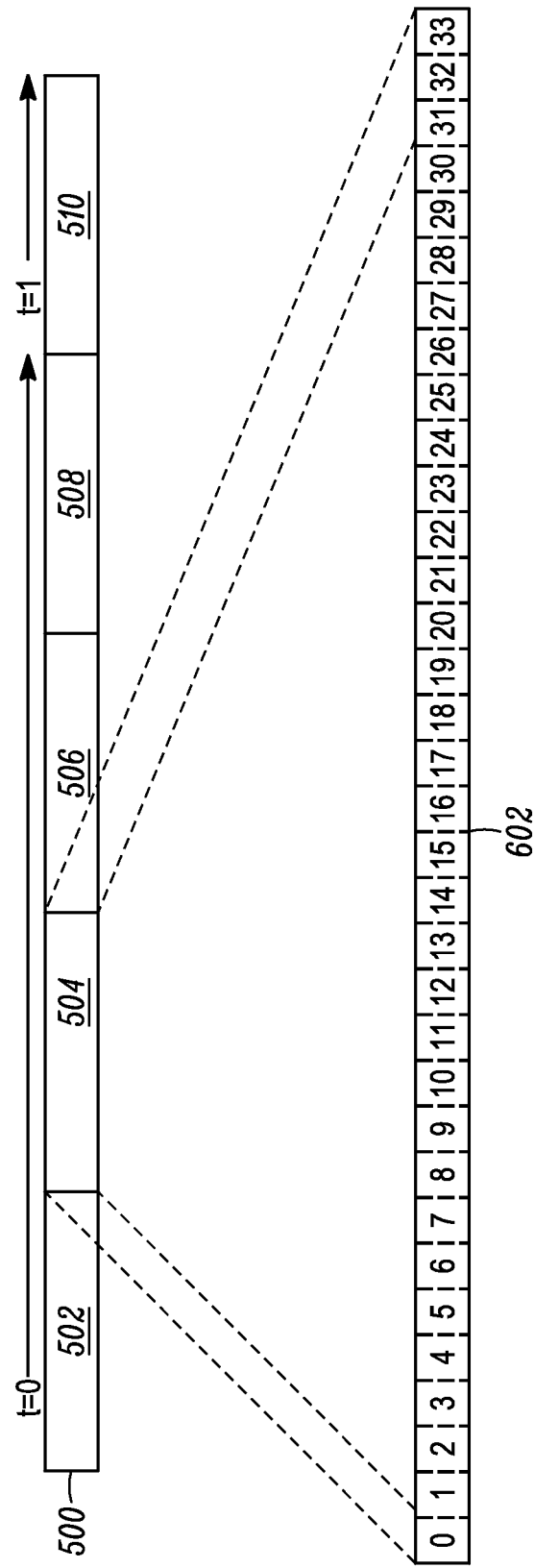
Figure 7:
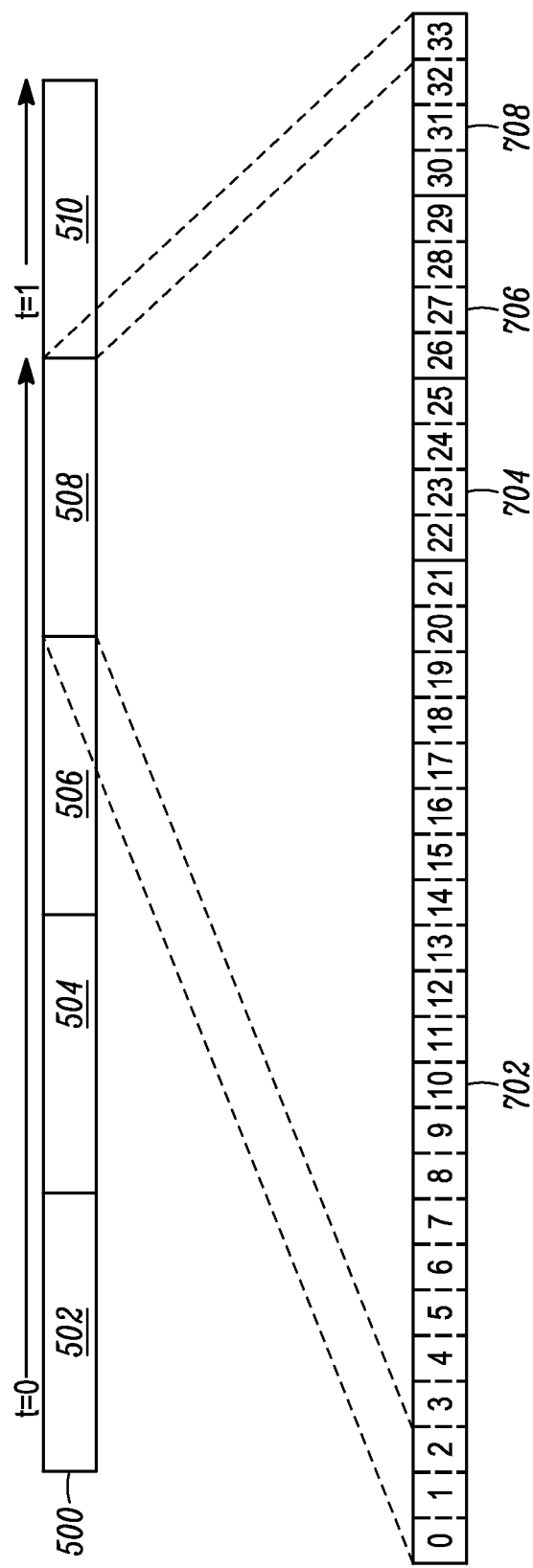

FIGS. 5-7 depict an example air-interface link in the time domain, in accordance with various embodiments. As shown in FIG. 5, the time axis of air-interface link 500 is separated into one or more frames 502-510. Frames 502-508 are in a first time period t=0, and frame 510 is in a second time period t=1, though these designations are purely by way of example and not by way of limitation. Moreover, all of the below-described ways in which the air interface could vary from implementation to implementation may require, especially for more dynamic approaches, that relevant air-interface structural parameters be announced to the nodes in the network in advance, such as at the beginning of a given time period.

Frames 502-510 could all be of the same size—that is, the frames could all be of the same length of time. Or any one or more of the frames could be of respectively different sizes with respect to the other frames. The sizes of the frames could be static or could vary based on, e.g., an amount of air-interface resource requests, an amount of resources requested in the requests, and/or the signal-to-noise-and-interference ratio (SINR) of any one or more of the nodes, among numerous other examples. It should be understood that additional or fewer frames may be present and could take forms similar or identical to those of frames 502-510.

As shown in FIGS. 5-7, a respective frame may be further separated into time slots. For example, each of frames 502, 504, and 508 are separated into time slots 0-33, which (like the respective frames themselves) could all be of the same size or could be of respectively different sizes. The sizes could be static or could vary based on the factors described above with reference to frames 502-510 (among other possibilities). Each of frames 502-510 could have the same number of time slots, or could have respectively different numbers of time slots. It should be understood that additional or fewer time slots could be present, and that further subdivisions of one or more time slots is possible.

One or more time slots in a given time period may designated for specific purposes, such as for broadcasting resource requests, resource-request receipt confirmations, and/or verification values, for designating a controller node for a next time period, and/or for use as air-interface resources (including resources assigned to a given node), among other examples.

In certain examples, one or more time slots are allocated exclusively to a given node, perhaps for carrying out a function such as broadcasting continuation resource requests, as is further discussed below. Additionally or alternatively, one or more time slots may be designated for multiple access. For example, time slots 516 (numbered 9-21) may be designated for multiple access (e.g., for new resource requests), as is further discussed below.

Purpose-specific time slots may be grouped as contiguous slots within a respective frame, as is the case for time slots 518, 602, and 702, as further discussed below. Additionally, purpose-specific time slots may be contiguous as between frames within a given time period, as is the case for time slots 518 and 602 in adjoining frames 502 and 504, as is further discussed below.

In some embodiments, such time slots may not be contiguous between frames and/or within frames. For example, as is further discussed below, in the embodiments illustrated in FIGS. 5-7, time slots 518, 602, and 702 are reserved for use as air-interface resources, while slots 512, 514, 516, 704, 706, and 708 are reserved for other uses (such as designating a controller node for a next time period). As shown, in various different scenarios, the time slots in a given frame that are reserved for use as air-interface resources could include all of the time slots in a given frame (as is the case for time slots 602 in frame 504) or less than all of the time slots (as is the case for time slots 518 and 702 in frames 502 and 508, respectively). A given frame within a time period may contain no time slots at all reserved for use as air-interface resources (if, for example, other frames within the current time period do contain time slots reserved for use as air-interface resources). And certainly numerous other examples could be listed.

Returning to FIG. 4, the examples process 400 begins at step 402, with node 300 obtaining one or more air-interface resource requests for the current time period. Network 200 includes a controller node for a current time period, as briefly described above with reference to FIG. 2. Node 300 or another node could be the controller node for the current time period (or any other time period).

In at least one embodiment, each obtained resource request indicates a requesting node and a requested resource. The node from which a given resource request is received may be different than the requesting node. In an embodiment, the requested air-interface resource takes the form of (or includes) one or more time slots. The requests could explicitly indicate the requested number of time slots and/or could indicate, for example, a number of bits, symbols, audio samples, video frames, etc., which may be used by one or more other nodes in the network to derive the requested number of time slots.

A respective air-interface resource request may take the form of (or include) a continuation resource request pertaining to at least one previous time period (i.e., one or more requests may pertain to given nodes requesting to keep their allocation of a given resource from one time period to the next). As another possibility, a resource request may take the form of a new resource request (that does not pertain to a previous time period).

A given node may obtain air-interface resource requests by (among other possibilities) generating resource requests (which might then be broadcast to other nodes in network 200) and/or by receiving the requests from other nodes in the network via its wireless-communication interface (e.g., wireless transceiver), among other possibilities.

Thus, in at least one embodiment, obtaining the one or more resource requests includes receiving a particular resource request from a second node in the network; and in at least one such embodiment, that second node is the requesting node indicated by the particular resource request. And in at least one other such embodiment, a third node is the requesting node indicated by the particular resource request. And in at least one embodiment, the node 300 may also receive the particular resource request from the third node. Moreover, in any of these embodiments, the node 300 could generate and broadcast one or more resource requests in addition to receiving one or more requests. And certainly other possibilities exist.

Regarding embodiments involving generating and broadcasting one or more resource requests, one or more of such requests could be continuation resource requests, and the node 300 may broadcast those one or more continuation resource requests during one or more time slots allocated exclusively to that node for broadcasting continuation resource requests. Furthermore, in at least one embodiment, in designated time slots following those time slots allocated exclusively to particular nodes to make initial broadcasts of continuation requests, the various nodes in the network may retransmit any continuation requests received during those time slots designated for initial broadcasts of continuation requests. This would tend to increase the likelihood that all initial broadcasts of continuation requests are received by all nodes. In at least some such embodiments, nodes may measure the signal strength (RSSI/SINR/SQI) at which they receive those initial broadcasts, and may further include one or more such measurements in any rebroadcasts.

In at least one embodiment, one or more of such requests are new resource requests, and the node 300 broadcasts those one or more new requests during one or more time slots designated for multiple access. In at least one such embodiment, the following function is also carried out: rebroadcasting a particular new resource request in response to determining that a new-resource-request rebroadcast received from the controller node does not include the particular new resource request. That is, in instances where the node 300 is not the controller node, and where the node that is the controller node is arranged to rebroadcast any requests it receives during one or more time slots designated for multiple access, the node 300 may receive a rebroadcast, notice that its request is missing, and responsively rebroadcast the request, perhaps according to a collision-avoidance approach such as a delay determined by an exponential-backoff function.

In at least one embodiment, node 300 (that is carrying out example process 400) is the controller node. And in at least one such embodiment, node 300 broadcasts (perhaps at the outset of the current time period) an identification (i.e., announcement, notice, or the like) of one or more time slots designated for multiple access. Moreover, consistent with the above discussion, in at least one embodiment in which node 300 is the controller node, node 300 receives one or more new resource requests during one or more time slots designated for multiple access, and then rebroadcasts those one or more received new resource requests.

At step 404, node 300 uses a network-standard algorithm for deriving a network-wide resource-allocation schedule for the current time period based at least in part on the obtained resource requests. That is, the node 300 carries out step 404 using the same (i.e., network-standard) algorithm as every other node in the network 200, so that every node will (or at least is programmed to) arrive at the same (i.e., network-wide) resource-allocation schedule for the current time period (and for other time periods as well, during those respective time periods). Moreover, in at least one embodiment, one or more of the obtained resource requests include respective priority values associated with a priority of the requesting device and/or associated with a designated priority of the resource-allocation, and deriving the network-wide resource-allocation schedule for the current time period based at least in part on the obtained resource requests includes deriving the network-wide resource-allocation schedule for the current time period based at least in part on one or more of the priority values.

Thus, for example, the node 300 (and every other node in the network 200) may group all high-priority requests first, all medium-priority requests next, and all low-priority requests last; and furthermore, within each of those groups, continuing requests could be prioritized over new requests, requests for less (or more) air-interface resources could be prioritized over other requests, requests from nodes with poor SINRs could be prioritized over nodes with high SINRs (who presumably would be present in an ensuing time period to receive their associated data), and/or the like. Moreover, once any and all prioritization criteria have been considered, the node 300 (and the other nodes in the network 200) may use a default order (such as ascending MAC (Media Access Control) address and/or the like). And certainly numerous other example implementations could be listed.

The network-wide resource-allocation schedule may facilitate avoidance of collisions by specifying respective times at which respective nodes are permitted to transmit over the air-interface link. In an embodiment, the air-interface resource requests take the form of (or include) requests for one or more time slots in the current time period, and the network-wide resource-allocation schedule takes the form of (or includes) an allocation schedule with respect to one or more time slots in the current time period. For example, with reference to FIGS. 5-7, a first node may be designated time slots ranging from frame 502, slot 0 through frame 504, slot 31, while a second node is designated time slots ranging from frame 504, slot 32 through frame 508, slot 21. Only the node that is designated a respective time slot is permitted to transmit during that time, thus avoiding collisions.

At step 406, node 300 verifies the derived resource-allocation schedule based at least in part on a verification value, where the verification value was derived by the controller node from the network-wide resource-allocation schedule using a network-standard verification function. The verification function may be a checksum function that produces a checksum. The checksum function could take the form of (or include) a cyclic redundancy check (CRC) algorithm, and/or a cryptographic hash function such as MD5, SHA-2, and/or SHA-3, among numerous other possibilities known to those having skill in the relevant art. In at least one embodiment in which the node 300 (that is carrying out the example process 400) is the controller node, carrying out step 406 involves, after deriving the verification value, broadcasting that derived verification value to the other nodes in the network. In at least one embodiment in which the node 300 is not the controller node, carrying out step 406 involves receiving the verification value from the controller node; deriving a local verification value from the network-wide resource-allocation schedule using the network-standard verification function; and comparing the received verification value with the local verification value.

At step 408, node 300 operates according to the verified network-wide resource-allocation schedule for the current time period, including transmitting data during time slots indicated by the verified resource-allocation schedule to be allocated to the node 300. Other aspects of operating according to the verified network-wide resource allocation schedule could be listed here, as known to those having skill in the relevant art. Moreover, it is noted that the verified network-wide resource-allocation schedule (and thus a given "time period" as that term is used herein) could be completed within a given frame of a given wireless-communication protocol, but could just as well span across multiple frames. As one example, node 300 may operate according to the verified network-wide resource-allocation schedule within the frame 510 that is designated as corresponding to a time period t–1. As another example, node 300 may operate according to the verified network-wide resource allocation schedule in a time period designated t=0, corresponding to frames 502-508. And certainly numerous other examples are possible.

Moreover, in at least one embodiment, the node 300 also identifies a controller node for a next time period. Identifying the next-period controller node may involve, for example, node 300 (and the other nodes in network 200) voting for a given node to be the controller node: the node with the greatest number of votes (for example) may be identified as the controller node. Additionally or alternatively, identifying the controller node for the next time period could involve node 300, a current-period controller node (which could be node 300), and/or another node designating a given node as the controller node. Node 300 may vote for, designate, or otherwise identify the next-period controller node based on one or more factors such as the signal-to-noise ratio of other nodes in network 200 and/or the average number of hops between respective nodes, among numerous other possibilities.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method carried out by a given node within an ad-hoc wireless network of nodes, the network including a controller node for a current time period, the method comprising:
   obtaining one or more air-interface resource requests for the current time period, each obtained resource request indicating a requesting node and a requested resource;
   using a network-standard algorithm for deriving a network-wide resource-allocation schedule for the current time period based at least in part on the obtained resource requests;
   verifying the derived resource-allocation schedule based at least in part on a verification value, the verification value having been derived by the controller node from the network-wide resource-allocation schedule using a network-standard verification function; and
   operating according to the verified resource-allocation schedule for the current time period;
   wherein obtaining the one or more resource requests comprises generating and broadcasting one or more resource requests;
   wherein the one or more generated resource requests include one or more new resource requests, wherein broadcasting the one or more generated resource requests comprises broadcasting one or more of the generated new resource requests during one or more time slots designated for multiple access;
   further comprising rebroadcasting a particular new resource request in response to determining that a new-resource-request rebroadcast received from the controller node does not include the particular new resource request.

2. The method of claim 1, wherein each requested resource comprises one or more requested time slots in the current time period, and wherein the network-wide resource-allocation schedule comprises an allocation schedule with respect to one or more time slots in the current time period.

3. The method of claim 1, wherein obtaining the one or more resource requests comprises receiving a particular resource request from a second node in the network.

4. The method of claim 3, wherein the second node is the requesting node indicated by the particular resource request.

5. The method of claim 3, wherein a third node is the requesting node indicated by the particular resource request.

6. The method of claim 5, wherein obtaining the one or more resource requests further comprises receiving the particular resource request from the third node.

7. The method of claim 3, wherein obtaining the one or more resource requests further comprises generating and broadcasting one or more resource requests.

8. The method of claim 1, wherein the one or more generated resource requests include one or more continuation resource requests, wherein broadcasting the one or more generated resource requests comprises broadcasting one or more of the generated continuation resource requests during one or more time slots allocated exclusively to the given node for broadcasting continuation resource requests.

9. The method of claim 1, wherein one or more of the obtained resource requests comprise respective priority values, wherein deriving the network-wide resource-allocation schedule for the current time period based at least in part on the obtained resource requests comprises deriving the network-wide resource-allocation schedule for the current time period based at least in part on one or more of the priority values.

10. The method of claim 1, wherein the network-standard verification function comprises a hash function.

11. The method of claim 1, wherein the given node is the controller node.

12. The method of claim 11, further comprising broadcasting an identification of one or more time slots designated for multiple access.

13. The method of claim 11, wherein obtaining the one or more resource requests comprises receiving one or more new resource requests during one or more time slots designated for multiple access, the method further comprising rebroadcasting the one or more received new resource requests.

14. The method of claim 11, wherein verifying the derived resource-allocation schedule based at least in part on the verification value comprises broadcasting the derived verification value.

15. The method of claim 1, wherein the given node is not the controller node.

16. The method of claim 15, wherein verifying the derived resource-allocation schedule based at least in part on the verification value comprises:
receiving the verification value from the controller node;
deriving a local verification value from the network-wide resource-allocation schedule using the network-standard verification function; and
comparing the received verification value with the local verification value.

17. A method carried out by a given node within an ad-hoc wireless network of nodes, the network including a controller node for a current time period, the method comprising:
obtaining one or more air-interface resource requests for the current time period, each obtained resource request indicating a requesting node and a requested resource;
using a network-standard algorithm for deriving a network-wide resource-allocation schedule for the current time period based at least in part on the obtained resource requests;
verifying the derived resource-allocation schedule based at least in part on a verification value, the verification value having been derived by the controller node from the network-wide resource-allocation schedule using a network-standard verification function; and
operating according to the verified resource-allocation schedule for the current time period;
wherein the given node is the controller node;
wherein obtaining the one or more resource requests comprises receiving one or more new resource requests during one or more time slots designated for multiple access, the method further comprising rebroadcasting the one or more received new resource requests.

18. A method carried out by a given node within an ad-hoc wireless network of nodes, the network including a controller node for a current time period, the method comprising:
obtaining one or more air-interface resource requests for the current time period, each obtained resource request indicating a requesting node and a requested resource;
using a network-standard algorithm for deriving a network-wide resource-allocation schedule for the current time period based at least in part on the obtained resource requests;
verifying the derived resource-allocation schedule based at least in part on a verification value, the verification value having been derived by the controller node from the network-wide resource-allocation schedule using a network-standard verification function; and
operating according to the verified resource-allocation schedule for the current time period;
wherein the given node is the controller node;
wherein verifying the derived resource-allocation schedule based at least in part on the verification value comprises broadcasting the derived verification value.

* * * * *